Inventor
PIERRE STENNE

Nov. 2, 1971 P. STENNE 3,616,536
APPARATUS FOR THE CONTINUOUS MANUFACTURE OF CHEESE
Filed June 27, 1969 4 Sheets-Sheet 3
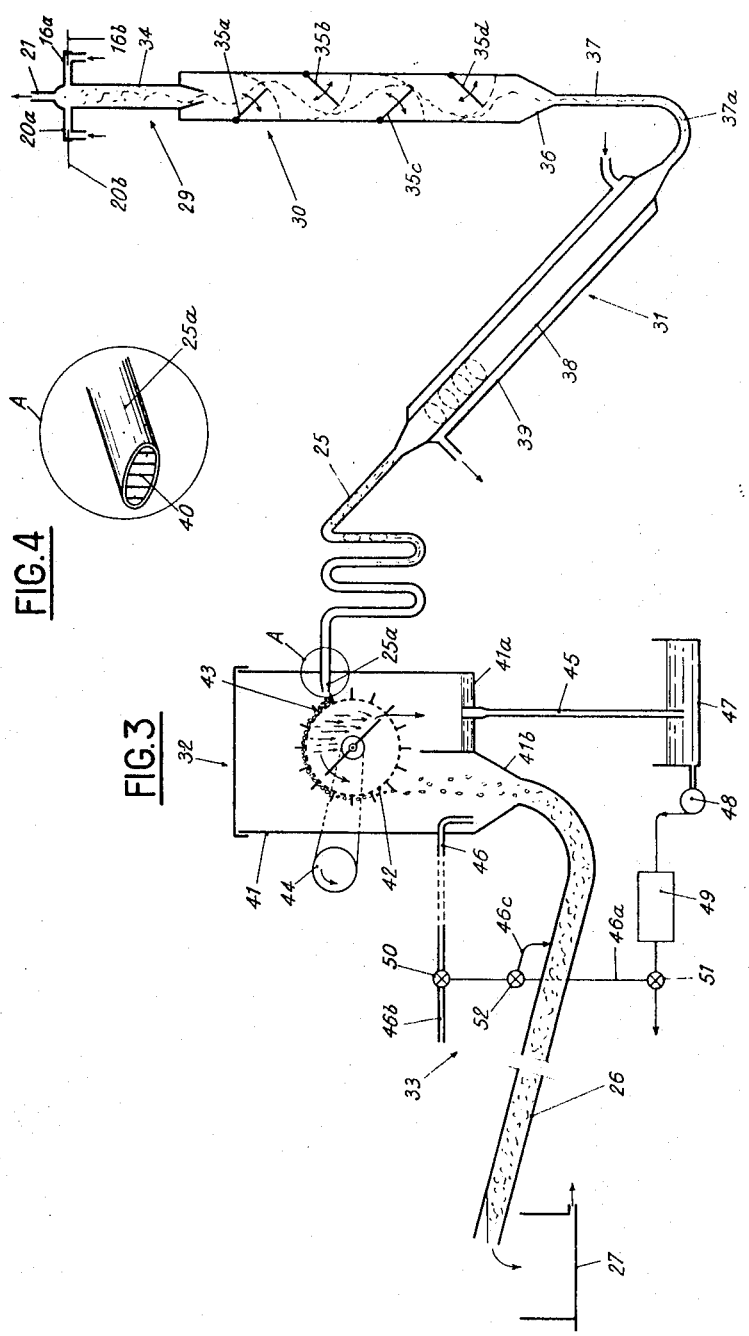
Inventor
PIERRE STENNE
By Holcombe, Wasserill + Brisebois
Attorneys

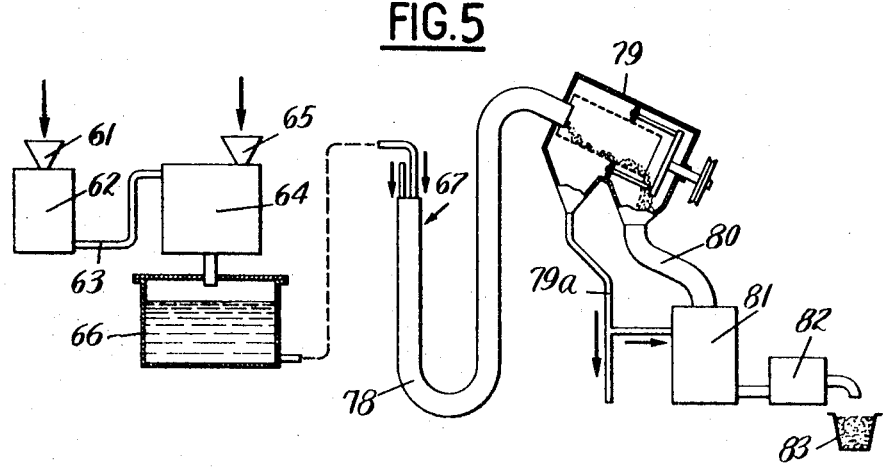
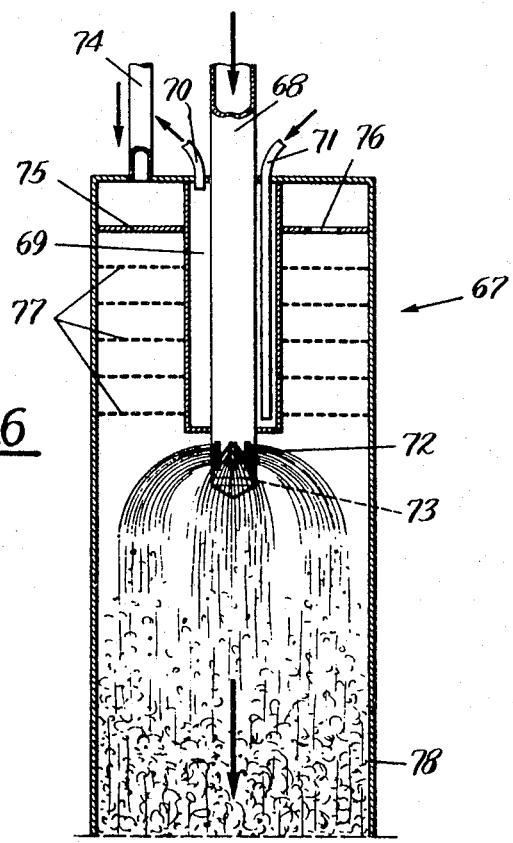

United States Patent Office 3,616,536
Patented Nov. 2, 1971

3,616,536
APPARATUS FOR THE CONTINUOUS MANUFACTURE OF CHEESE

Pierre Stenne, Vitry-le-Francois, France, assignor to Paracurd S.A., Geneva, Switzerland
Continuation-in-part of applications Ser. No. 549,669, May 12, 1966, and Ser. No. 833,831, Mar. 28, 1969, the latter being a continuation-in-part of application Ser. No. 439,829, Mar. 15, 1965. This application June 27, 1969, Ser. No. 842,431
Claims priority, application France, May 12, 1965, 1458172
Int. Cl. A01j 25/00
U.S. Cl. 31—46                                    9 Claims

ABSTRACT OF THE DISCLOSURE

Apparatus for the continuous manufacture of cheese comprises means for continuously advancing inoculated condensed milk while rennet and water are successively added thereto, syneresis is completed, and the whey is separated from the curds.

---

This application is a continuation-in-part of my co-pending applications Ser. No. 549,669, filed May 12, 1966, and Ser. No. 833,831, filed Mar. 28, 1969, now abandoned, which was itself a continuation-in-part of my prior application Ser. No. 439,829, filed Mar. 15, 1965, now abandoned. These prior applications claimed certain novel methods of making cheese and the present application is directed to the apparatus used in carrying out said process, which apparatus was described in said prior applications.

In order that the utility of the apparatus may be readily appreciated, a brief description of the general type of process for which it was designed will first be given.

This process consists in first concentrating normal (whole) milk, which may have been filtered, standardized, homogenized and pasturized, until the percentage of solids is from two to four times that prevailing in normal milk. This concentration is effectuated in an evaporator of a conventional type, preferably a film evaporator, which operates under subatmospheric pressure, using a thin sheet of liquid and a temperature below that at which the proteins in the milk would denature (about 65° C.).

After the concentrating step, the concentrated milk is immediately cooled in a heat exchanger to a temperature less than about 10–12° C. The concentrated milk is then stored at this temperature in insulated vats having double walls, and about 2% of lactic ferments is introduced to create lactic flora for the protection of the mixture. After having been stored for several hours, the temperature of the concentrated milk is increased to about 30° C., and a supplemental dose of about 5% of the same lactic ferments is added to the milk. At this temperature the presence of the lactic ferments brings about a progressive transformation of the lactoses of the milk into lactic acid. The pH of the mixture then becomes acid, and when this pH reaches a value between about 4.6 and 6.5 the concentrated milk is cooled to a temperature below about 10° C.

The desired pH may in certain cases be obtained directly, or may be adjusted in the process just described, by adding to the milk a quantity of lactic ferments such that the desired pH is obtained immediately.

A quantity of rennet corresponding to that normally used in conventional processes for obtaining the type of cheese in question is then added to the concentrated and acidified cold milk. The dose of rennet added to the concentrated milk is the same in absolute value as would have been added to the normal milk. Dependent upon the time of contact between the concentrated milk and the rennet, the enzymatic action of the rennet will have a greater or smaller effect, and after the concentrated milk which has been so treated has been rapidly reheated, an instantaneous or controlled rapid coagulation is obtained.

This coagulating step is followed by a draining step the length and nature of which depends on the type of cheese being made.

In particular, when soft cheeses are to be made, the cold concentrated milk is kept in contact with the rennet for from about 5 to about 12 minutes. It is then heated rapidly by mixing it with hot water and coagulation results in a short time, between about 40 and about 120 seconds, the mixture being kept still at the moment of coagulation.

The dilution effectuated during this reheating step lasts for such a short time before the collection or pressing of the curd that the phosphocaseinate particles do not have time enough to return to the state in which they existed in the normal starting milk, and consequently all the advantages resulting from use of the concentrated mixture are retained.

When the curd has attained a certain firmness it is sliced to permit a suitable syneresis. This is followed by spontaneous slow draining, and the curd is then separated into conventional cheese molds.

When making a semi-soft cheese, the cold concentrated milk is left in contact with the rennet for a little longer than in the previous case, from about 30 to about 60 minutes, for example. The concentrated acidified cold milk is then reheated by introducing it into a stream of non-turbulent hot water. The concentrated milk coagulates almost instantaneously without any dilution. The curd grains are then washed and agglomerated by mechanical means, thus accelerating the drainage.

When making a cured or hard cheese, of the Cheddar type, for example, the cold concentrated milk, acidified to a suitable pH, is kept in contact with the rennet for about 30 to 60 minutes. It is then introduced into a non-turbulent stream of hot water, at an appropriate temperature, the rate of flow of which is from 1 to 3 times that of the concentrated milk, depending upon the type of cheese to be made. Coagulation is then immediate. The grains of the curd are mechanically agglomerated and the grain is separated from the whey. The whey, after heating in a heat exchanger to an appropriate temperature, is reintroduced into the curd, so as to produce a curing of the curd, and in the case of Cheddar, an appropriate scalding which is a first step in the cheddarization operation.

While the milk is being ripened by the lactic ferments, the required heating and cooling steps to which it must be subjected may be carried out by circulating the concentrated milk in a suitable heat exchanger, heated by hot water or steam, or cooled by a refrigerating fluid. These different operative steps may be programmed or controlled automatically and the ferments may be added manually or by automatic dosing means, with the operator controlling the acidity and temperature of the concentrated milk. In like manner, the rennet may be added manually or automatically, either by leading the acidified concentrated cold milk through batteries of vats having gauged volumes, in which the rennet is added to and mixed with the concentrated milk, and in which the concentrated curdled milk remains for a predetermined time, or by continuously injecting the rennet into a tube through which the concentrated milk is pumped. This tube is so dimensioned that the milk remains in it for a period of time say 5 to 60 minutes, dependent on the type of cheese being made.

A further object of the present invention is to provide means for carrying out the foregoing process, i.e., means for coagulating a concentrated, acidified cold milk, to which rennet has been added, by rapidly adding hot water, then separating the curds from the whey, and finally washing the grains of curd either with hot or cold water, or with whey, or with a mixture of water and whey, which may be hot, or chilled, or at room temperature and finally collecting the curd for subsequent molding in conventional cheese molds.

Several embodiments of the invention which are suitable for use in carrying out one or more processes of the foregoing general type are illustrated in the accompanying drawings in which:

FIG. 3 is a schematic view showing an alternative embodiment of the apparatus of FIG. 2;

FIG. 4 is a detail view showing on an enlarged scale the encircled portion of FIG. 3 indicated by the letter A;

FIG. 5 schematically illustrates the different stages of a related process in which rennet is not required; and FIG. 6 is an axial sectional view through an injection head which is particularly useful in the process of FIG. 5, but may also be used in other processes of the general type hereinbefore described.

Figure 1:
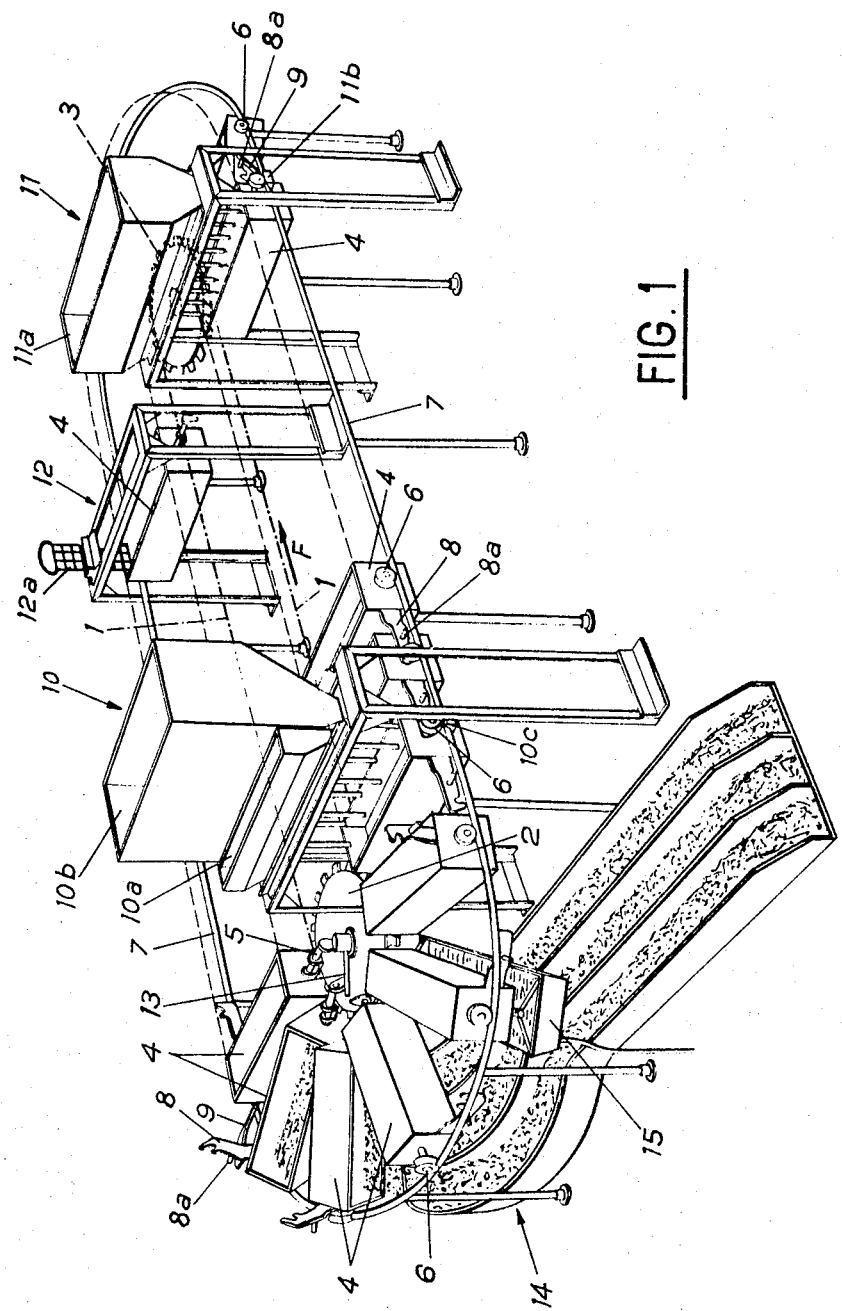
FIG. 1 is a schematic perspective view showing an installation for manufacturing either soft or pressed cheese, which installation can be operated continuously and automatically.

On FIG. 1, reference numeral 1 indicates an endless chain which travels over two sprocket wheels 2 and 3, wheel 3 being driven. Tanks 4, which are rectangular in section, are attached to this chain by means of shafts 5. Each tank is supported at its opposite end by a roller 6 which rolls on a track 7. The tanks travel in the direction indicated by the arrow F, FIG. 1. In the straight sections of their path of travel the tanks are connected to each other by catches 8 which bear on the axes of the rollers 6. The tanks are disconnected when they arrive at the curved portions of this path of travel, by ramps 9, which lift the pins 8a carried by the catches 8. Gantries 10, 11 and 12 are positioned above the straight portions of the path of travel.

The gantry 10 comprises a device 10a–10b which can empty into a tank 4, when it passes beneath the gantry 10, a measured quantity of rennet from the tank 10a, and then a quantity of concentrated cold milk from the tank 10b. The gantry 11 comprises a device 11a from which the tanks 4 may be uniformly dosed with hot water. The gantry 12 is provided with cuting grilles 12a.

In the curved portion following the gantry 12, a bar 13 fixed to the framework of the machine swings the tanks 4 around the axis 5. This tilting takes place over a distributor 14. Between the position at which the bar 13 tilts the tanks 4, and the gantry 10, is a tank washing device 15 schematically shown on FIG. 1.

In the above described apparatus, when one of the tanks 4 passes under the gantry 10, the switch 10c causes the introduction into this tank of a predetermined quantity of rennet, which is well distributed through the tank, followed by a predetermined quantity of concentrated cold milk which has been inoculated with lactic ferments. The chain 1, is driven by the sprocket wheel 3, which is driven by an electric motor provided with speed control means, which motor insures movement of the tank 4 along the track at a constant, but adjustable, speed in the direction indicated by the arrow F. The quantity of concentrated milk and rennet introduced into the tank 4 is controlled by a mechanism capable of measuring within an error of 0.1% the quantities of liquid dispensed into each tank. The inlet pipes are so positioned as to insure thorough mixing of the concentrated milk and rennet in each tank 4.

The tanks 4, filled with concentrated milk which has been dosed with rennet and is maintained at a temperature of about 10° C., moves from beneath the gantry 10 to beneath the gantry 11. The distance between these two gantries determines the length of time that the cold concentrated milk remains in contact with the rennet. This length of time may also be regulated by controlling the speed at which the chain 1 moves. When the tank 4 comes to a position beneath the gantry 11, a switch 11b is thrown and causes delivery into the tank of a quantity of hot water. The device 11a insures that this water is well distributed throughout the tank. This water is kept at a constant temperature (about 50° C., for example) by suitable automatic temperature regulating means. The quantity of water introduced, and its temperature, are so regulated that the temperature of the resulting mixture will be of the order of 30° C.–35° C. and that the percentage of solids in the mixture will be about 1.1 times the percentage of solids in the original milk, before it was concentrated. The quantities of concentrated milk and hot water in each tank are so measured out as to yield, after curdling and draining, one or more cheeses of equal weight.

After introduction of the hot water, the tank 4 continues to move along the track. The time required for coagulation at a given temperature, is essentially a function of the time during which the cold milk was in contact with the rennet before the hot water was added.

If the time of cold contact with the rennet is small, the time required for coagulation is relatively long and the gantry 12 must be spaced a relatively long distance from the gantry 11, so that between the gantries 11 and 12 the mixture in the tanks 4 will have time to form sufficiently firm curds.

When the tank passes under the gantry 12, the cutting grilles 12a move through the tank 4. The curd, which forms in from 40 to 120 seconds, depending on the acidity of the original concentrated milk, the temperature, the time of cold contact with the rennet, and the quantity of rennet, is thus cut into small cubes. At this point syneresis begins (the phase during which the whey separates from the grains of curd).

If, on the contrary, the rennet was in contact with cold milk for a relatively long time, say 30 minutes or so, coagulation is instantaneous upon the introduction of hot water. The hot water then washes the grains of curd as well as causing their coagulation. In this case the cutting grilles of the gantry 12 are not actuated when the tank 4 passes under the gantry 12.

When the tanks 4 reach the curved part of the track which follows the gantry 12, they are automatically emptied by tipping them above the distributor 14, which divides the curd up evenly before it enters the molds. The tanks 4 are then washed and dried by the device 15 and return to their original position under the gantry 10.

It will be appreciated that this machine may be of a reasonable size, in view of the short curd forming and draining time required by the process according to the present invention, whereas a continuous operating machine using the previously known processes would have to be extremely large and costly.

Figure 2:
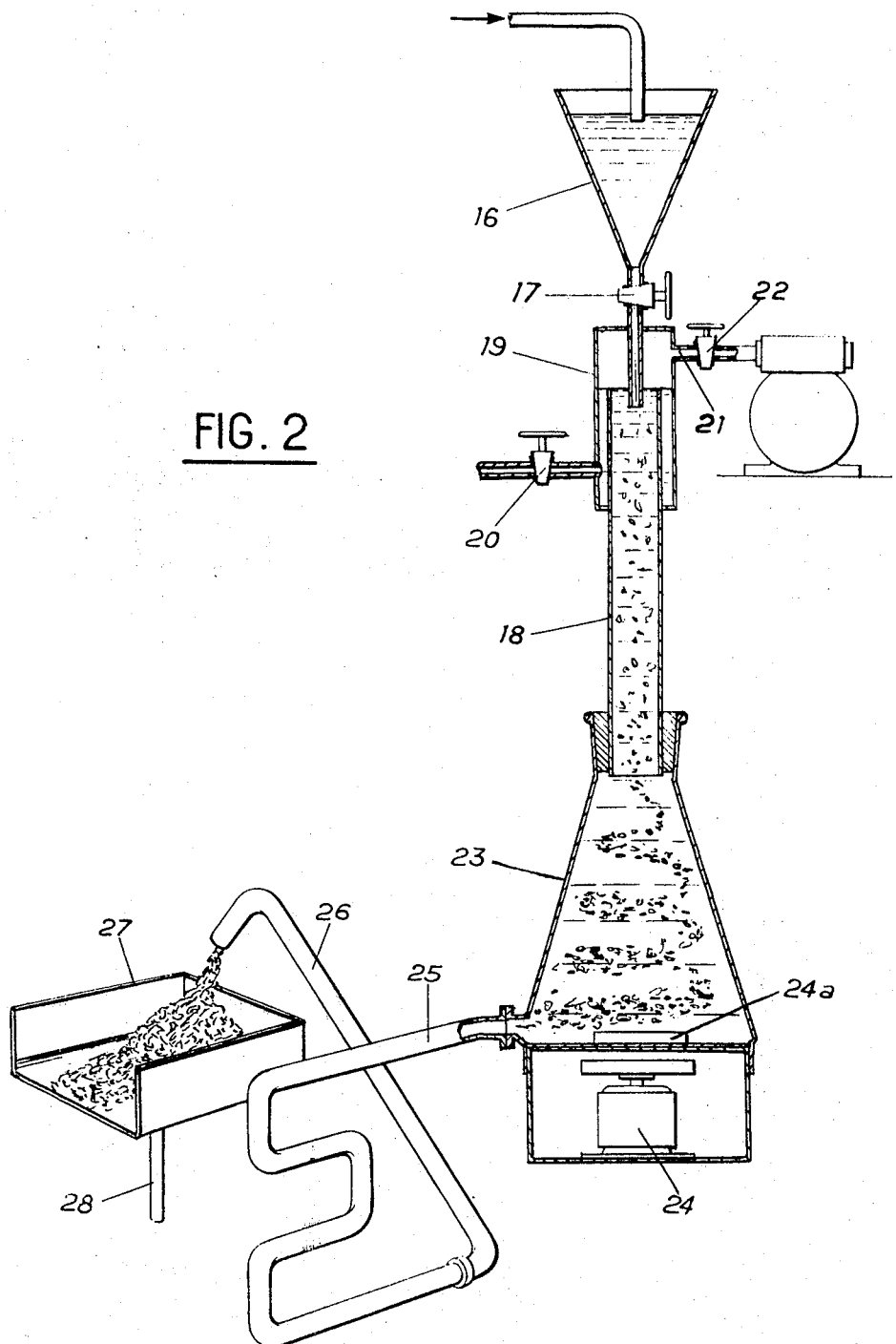
FIG. 2 is shows apparatus for manufacturing a pressed or "hard" cheese, which can be operated continuously and automatically.

FIG. 2 shows another type of apparatus which may be used to carry out the process constituting the present invention. In this apparatus, it will be seen that the concentrated, acidified, cold milk which has been treated with rennet is introduced into a funnel 16. The level of liquid in this funnel is kept constant by known means. The funnel 16 is provided with a valve 17 at its lower end and opens into a vertical tube 18, the upper part of which is encircled by a jacket 19. Hot water is supplied to this jacket through an inlet pipe 20. At the top of the tube 18 the jacket 19 is suction means 21 provided with a control valve 22. The tube 18 is positioned above a container 23 in which there is a magnetic agitator 24, 24a. An elbowed tube 25 is connected to the lower part of the container 23 and is in turn connected to an inclined tube 26, which terminates over a container 27 having an outlet in its bottom.

In order to make a pressed cheese, the concentrated milk which is cold has been dosed with rennet, is led to the upper part of the apparatus and subjected to cold for an adequate length of time, of the order of thirty minutes, for example. It is at a temperature of about 10° C. Water at about 45° C. is introduced into the apparatus through the inlet tube 20. The pH of this water may be suitably adjusted and a slight vacuum is created by the suction means 21 so that once the apparatus has been filled with hot water, a column of water is maintained in the tube 18. The upper level of the column of water may be regulated according to the extent to which the concentrated milk is to be heated before coming into direct contact with the water. The jacket 19 makes it possible to provide a non-turbulent flow of hot water in the tube 18. When the valve 17 is opened, the cold, concentrated, rennet containing milk is sucked into the apparatus and falls into the column of hot water. The milk coagulates almost instantaneously and the grains of curd fall by gravity down through the column of water in the vertical tube 18. These grains reach the container 23 where they are stirred by the agitator 24a so that the grains of curd are washed in the liquid in the container. Carried by the flow of hot water which comes in through the tube 20 and leaves through the tube 26, the grains of curd travel along the tube 25. Since this tube is provided with elbows, the curd grains tend to settle and accumulate at these elbows. The curd grains are thus so mechanically agglomerated that small gobs of paste fall from the outlet end of the tube 26 into the tank 27, where they continue to drain, with the whey flowing out through the pipe 28. The paste left in the tank 27 may be removed by any appropriae means and transferred to conventional cheese molds.

In this apparatus, the agglomerating tube 25–26 may comprise either such elbows as shown in FIG. 2, or constrictions on baffles, or the tube itself may be of decreasing cross-section.

The grains may also be agglomerated by means of a centrifuge, which ensures the continuous separation of curd and whey or by the conventional discontinuous process using a sheet of cloth.

An alternative embodiment of the device which has just been described is shown on FIG. 3. The modifications which have been made are designed to adapt the apparatus to the manufacture of a greater variety of cheeses.

One such improvement consists in providing the apparatus of FIG. 2, with means permitting the introduction into a hot column of moving water of a number of streams of cold concentrated milk which has been acidified with lactic ferments and treated with rennet for a suitable time. The progress of the curds in the column may be regulated by adjustable baffles, to promote hardening. At the base of the column is a succession of vertical or inclined tubes which may have different cross-sections and elbows, and which terminate over a device for cutting up the mass of curds which issues from the tubes. Finally, there is means for washing the cut-up curds, and for bringing together the agglomerating the grains of curd.

This improved apparatus preferably comprises a column provided with adjustable baffles, supplied by a nozzle for introducing liquid turbulently (as shown on FIG. 3) or without turbulence (such as the injection head shown in the apparatus of FIG. 2) and followed by a tube the inclination of which permits the reagglomeration and syneresis of the curds by compression due to differences in cross-sectional area, and the effects of gravity. The mass of curds obtained in this way is then cut along two substantially vertical planes, by means, for example, of vertical wires and a rotating cylinder having radial vanes, the speed of rotation of the cylinder being such as to make it possible to adjust the thickness of the cut. The sliced curd is then washed, either with pure water, or whey, which may or may not be heated, this whey having been derived from the syneresis of the curds, allowing for the dilution due to the introduction of hot water at the top of the apparatus.

Referring now to FIG. 3, it will be seen that the assembly comprises a filling head 29, a vertical column 30 which holds the hot water into which the concentrated milk is introduced, and in which it is treated with rennet, and mixed with the hot water, the tubes 31 of varying cross-section which are fed from the column 30, the slicing means 32, and the washer 33.

The filling head 29 is provided with suction means 21 positioned near its upper end and two tubes 16a and 20a which are radially disposed and diametrically opposed. The tube 16a is connected to a pump and serves as an inlet for the cold, concentrated, rennet-treated milk. The tube 20a serves as an inlet for hot water. The tubes 16a and 20a carry thermometers 16b and 20b. The two fluid currents supplied through the tubes 16a and 20a are mixed in the vertical tube 34, which empties into the vertical tube 30.

This column 30 is square in section and is provided with baffles 35a, 35b, 35c, 35d which may be inclined at different angles by external control means. An intermediate member 36, at the bottom of the column 30, connects that column to a narrow cylindrical vertical tube 37, which is provided at its lower end with an elbow 37a which opens into a larger tube 38. The tube 38 is encircled by a jacket 39 through which a suitable fluid may be circulated. The tube 38 is inclined with respect to the horizontal and opens into a smaller tube 25, which comprises several bends, and terminates at 25a. The end 25a of the tube 25 is shown in greater detail on FIG. 4, and is provided with vertical wires 40 made of stainless steel. The assembly 31 comprises the tubes 37, 38 and 25.

The slicing means 32 comprises a tank 41 within which a hollow cylinder 42, made preferably of sheet steel, is rotatably mounted. The cylinder is provided with radial vanes 43 extending radially away from the cylinder, and its movement is controlled by a motor 44. The tank 41 comprises a receptacle 41a in which the whey is collected, which receptacle is drained by the tube 45. The tank is also provided with a funnel-shaped portion 41b, and a tube 46 opening into the tank immediately thereabove serves as an inlet for water or whey, which whey may be drawn from a tank 47 fed by the pipe 45. The whey is delivered to the tube 46 by the pump 48, followed by a heater 49. A tube 46b supplies water to the tube 46. Either of the tubes 46a and 46b may be used depending on the positions of the valves 50 and 51.

The lower part of the funnel 41b is connected to an elbow at the end of a tube 26 which is inclined slightly with respect to the horizontal, with its upper end opening over a mold 27. The tube 26 may be supplied with whey near its mid-point through a tube 46c, connected to the tube 46a and controlled by the valve 52.

When the concentrated milk, which has been inoculated with lactic ferments and exposed to rennet for about 30 minutes at a temperature of 8 to 10° C., is introduced into the filling head 29 through the tube 16a, it comes into contact with the stream of hot water injected through the tube 20a at a temperature of 48 to 53° C. The temperatures of the milk and hot water are measured by thermometers 16b and 20b. The arrangement of the tubes 16a and 20a is such that the two fluids are briskly and turbulently mixed, which fact has an influence on the size of the curd grains because the milk is almost instantly curdled. The fluid current carrying the curd grains in suspension then passes through the tube 34 and is injected into the top of the column 30. The tube 34 is kept constantly full of liquid by suction applied through the tube 21, which is connected to a vacuum pump.

The stream of fluid which enters the column 30 is rendered turbulent by the baffles formed by the vanes 35a, 35b, 35c, and 35d. The average line of flow may be regulated by adjusting the inclination of the baffles.

Such an adjustment permits control of the hardness of the curd grains, the syneresis of which is accelerated by its impacts against the baffles.

The fluid mixture containing the curd grains in suspension then enters the tube 37, which due to its smaller cross-section, causes an agglomeration of the curd grains. When the curd enters the tube 38 its mass is expanded due to the increase in the cross-section of the tube, and the curd will form itself into little blocks separated from each other by layers of whey mixed with hot water. In the tube 38 there is simultaneous syneresis of the curd grains and, due to the slope of the tube, a reagglomeration. If the jacket 39 is fed with hot water, the effect is to further compress the curd grains, that is to say, accelerate the syneresis.

The tube 25 at the end of the tube 38 is small in cross-section and contains a number of sharp turns or elbows so that the curds are further compressed, with further syneresis resulting. The curd which leaves through the orifice 25a is sliced along vertical planes by the wires 40. The sliced curd then comes in contact with the vanes 43 carried by the cylinder 42. These vanes, as the cylinder 42 rotates, cut the curd along planes substantially perpendicular to those along which it is cut by the wires 40. This double slicing of the curd may naturally be regulated by adjusting the speed of rotating of the cylinder 42, and produces a flow of whey which passes through the holes in the perforated sheet metal of which the cylinder 42 is made, and collects in the receptacle 41a.

The curd carried to the surface of the cylinder 42 between the vanes 43 falls into the funnel 41b. Regulation of the various parameters affecting this slicing operation makes it possible to obtain very different types of cheese structure.

The curd recovered in the funnel 41b enters the tube 26, through which it passes before falling into the mold 27. As it passes through the tube 26, the curd grains are washed by a liquid introduced through the tube 46 above the funnel 41b. This liquid may be water, at an adjustable temperature, which is admitted through the tube 46b, but may also be whey recovered from the receptacle 41a through the circuit 45, 47, 48, 49, 46a. This whey may or may not be heated, depending on whether the heater is placed in operation, and this heating is one parameter used to control certain cheese making processes.

The addition of heat at the moment of washing results in a compression of the grains and a maximum extraction of whey, so that a drier cheese is formed. In order to increase the efficacity of the washing carried out in the tube 26, the valve 52 may be opened so as to provide a second injection of whey or water through the tube 46c.

Depending upon whether or not the curd is washed in the assembly 33, a cheese is obtained which cures more or less rapidly. In effect, a very thorough washing removes a large part of the lactose in the paste, which permits the cheese to cure rapidly, whereas a less thorough washing, or practically none at all, yields a cheese which cures more slowly. In the first case a cheese of the Saint-Paulin type is obtained; in the second a cheese of the Cheddar or Gruyère type.

The embodiment of FIGS. 5 and 6 will now be described in the course of the following description of a representative process utilizing that apparatus.

The milk employed as the raw material is poured into the funnel 61 of the evaporator 62. This milk contains approximately 120 grams of dry solids per 1,000 cc., approximately 35 grams of which are fatty solids. The concentration is carried on down to a third of the original volume, so that about 3,300 cc. of concentrated milk is obtained from 10,000 cc. of natural milk. This concentrated milk is drained from the evaporator 62 through the pipe 63 to a dosing unit 64. The dosing unit 64 mixes the said concentrated milk with 10% by volume of lactic leavenings of the *Streptococcus lactis* type and of the *Streptococcus cremoris* type, fed into the apparatus through the funnel 65. The mixture thus formed is stored at 20° C. in a vat 66, for 12 hours. The pH value obtained at the end of this ripening period amounts to 4.9.

The milk is then drawn off from the vat 66 and led to an injection head 67.

The injection head 67 is of substantially cylindrical shape. It comprises an axial pipe 68 through which the ripened concentrated milk is injected. The pipe 68 is surrounded by a protective jacket 69 supplied with water at a temperature of approximately 15° C. through the pipe 71, this water being drained through the pipe 70. The injection pipe 68 is pierced at its lower extremity by vertical slots 72 distributed along its entire lateral surface. A piston 73 situated below these slots and within the pipe 68 renders it possible to cover the slots 72 partially, so that the speed of discharge of the jets of ripened concentrated milk injected may be controlled as a function of the rate of flow.

The injection head 67 also comprises at one side a hot water inlet 74. The hot water fed in through the pipe 74 impinges on a plate 75 which is provided with a hole 76 diametrically opposite the inlet 74. Several circular rings 77 made of fine wire mesh are positioned between the plate 75 and the upper part of the slots 72.

The ripened concentrated milk at 20° C. is fed into the injection head 67 through the pipe 68 at a rate of flow of approximately 44 gallons/hour, and the said injection head 67 is supplied at the same time with an equal flow of hot water at 70° C. The temperature of the concentrated milk is maintained substantially at 20° C. by means of the cold water jacket 69. The hot water is first injected into the injection head 67 in turbulent condition, but this water reaches the level of the slots 72 in substantially laminar flow conditions, by virtue of the plate 75 equipped with its hole 76 and of the different screens 77.

At this level, the longitudinal flow of hot water meets the concentrated milk discharged radially through the slots 72. The position of the piston 73 within the tube 68 is adjusted so that the speed of discharge of the concentrated milk is sufficient to cause mixing of the milk with the hot water as a whole, but insufficient for the concentrated milk to reach the lateral sides of the injection head 77. The ripened concentrated milk thus injected curdles immediately on coming into contact with the hot water, and the curds thus obtained are discharged into a tube 78 having a diameter of approximately 4 inches, this tube being U-shaped and its two vertical limb portions having a height of approximately 59 inches. The tube 78 opens into a rotary screen formed by a draining drum 79 which revolves at approximately 20 revolutions per minute. The length of this drum is sufficient to ensure the curds are drained sufficiently on issuing from the drum, that is to say so that it issues as a paste having a solids contents of approximately 30%. With the rates of flow and dimensions hereinbefore specified the draining action is completed approximately 4 minutes after the instant of formation of the curds in the injection head 67. The whey drained off flows out through the pipe 79a.

A pipe 80 conveys the curds to a stirring mechanism 81. If the curds obtained have an excessive overall solids content, this device renders it possible to reincorporate a certain quantity of the whey which has been drained off, or of acidified concentrated milk, which may have been flavored or not, into the paste, the reincorporation of concentrated milk rendering it possible to benefit from an appreciable increase in output. This device comprises cooling elements by means of which the temperature of the curds obtained may be reduced to 20° C. or even less, in such manner as to facilitate reincorporation into the curds of the whey drained off. After stirring, the paste is injected into a "smoothing" or homogenizing machine 82, and the fresh cheese is finally conditioned in the containers 83.

The quantity of whey drawn off through the pipe 19a is considerably smaller than that drawn off in the processes heretofore known, when allowance is made for the fact that for 10,000 cc. of natural milk employed as the raw material, one obtains 3,300 cc. of concentrated milk, and consequently 6,600 cc. of mixture after injection of the hot water.

The injection head 67 may of course be used in the manufacture of cheeses according to processes utilizing rennet, as well as the process which has been described in order to illustrate the utility of the apparatus of FIGS. 5 and 6.

What is claimed is:

1. Cheese-making apparatus comprising a column, said column being provided with a plurality of longitudinally spaced stationary constrictions, means at the upper end of said column for receiving and mixing separate streams of rennet-treated cold concentrated milk and hot water, and means connected to the lower end of the column for agglomerating the grains of curd formed by said milk and water in said column.

2. Apparatus as claimed in claim 1 in which said constrictions are baffles which are adjustable to regulate the extent to which they constrict the effective diameter of the column.

3. Apparatus as claimed in claim 1 in which said agglomerating means comprises a vertical tube which is smaller in section than said column, which vertical tube is connected at its bottom to an upwardly inclined tube provided with a heating jacket, said upwardly inclined tube being of larger diameter than said vertical tube and the lower end of said column being connected to the upper end of said vertical tube.

4. Apparatus as claimed in claim 1 in which said receiving means comprises means for forming said water into a shower and spraying said milk transversely into said shower.

5. Apparatus as claimed in claim 1 in which said receiving means is provided with two radially opposed passageways, through one of which said hot water is introduced and through the other of which said milk is introduced.

6. Apparatus as claimed in claim 3 in which said upwardly inclined tube feeds a syneresis tube which is smaller in section and formed with a plurality of elbows.

7. Apparatus as claimed in claim 6, comprising cutting means at the outlet of said syneresis tube, said cutting means comprising a vertical grille adjacent a rotatable cylinder provided with radially projecting vanes.

8. Apparatus as claimed in claim 1 in which said receiving means comprises an inlet at the top of said column for hot water, baffles below said inlet for converting said water into a shower, and a tube for supplying milk, said tube terminating below said baffles in radial openings through which said milk is sprayed into said shower of water.

9. Apparatus as claimed in claim 8 comprising piston means in said tube for regulating the effective cross-sections of said radial openings.

References Cited

UNITED STATES PATENTS

| | | | |
|---|---|---|---|
| 2,360,556 | 10/1944 | Fabricius et al. | 99—116 |
| 2,851,363 | 9/1958 | Kielsmeier | 99—116 |
| 2,917,827 | 12/1959 | Lankford | 31—46 |

HUGH R. CHAMBLEE, Primary Examiner